No. 667,413. Patented Feb. 5, 1901.
O. R. WEESE.
CHEESE CASE AND KNIFE.
(Application filed Apr. 14, 1900.)
(No Model.)
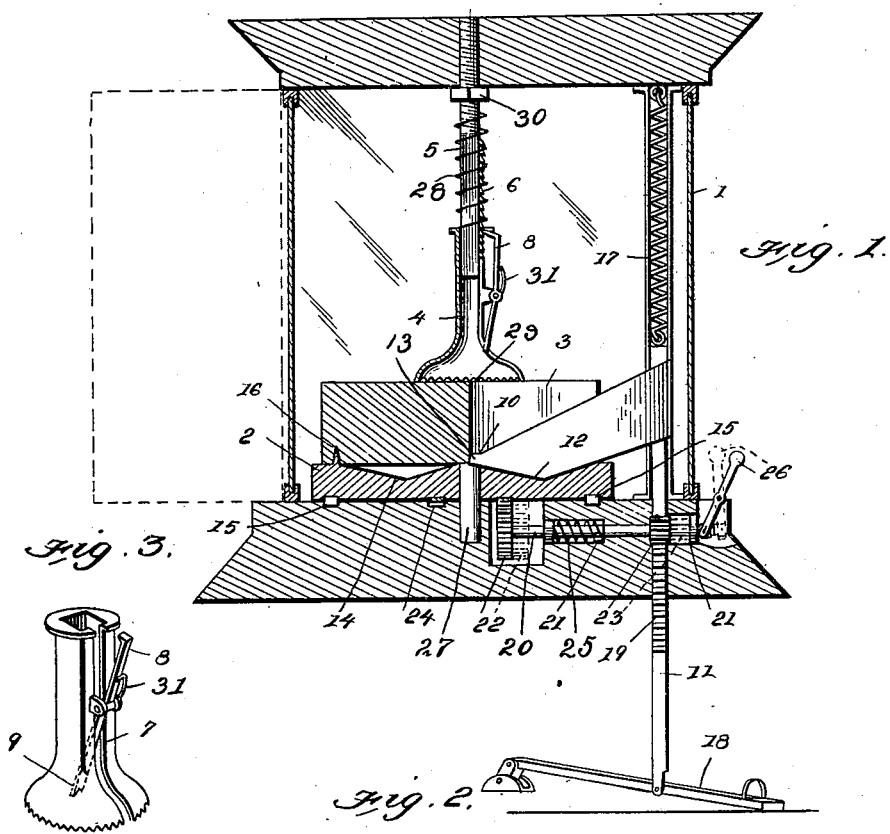
Fig. 1.
Fig. 3.
Fig. 2.
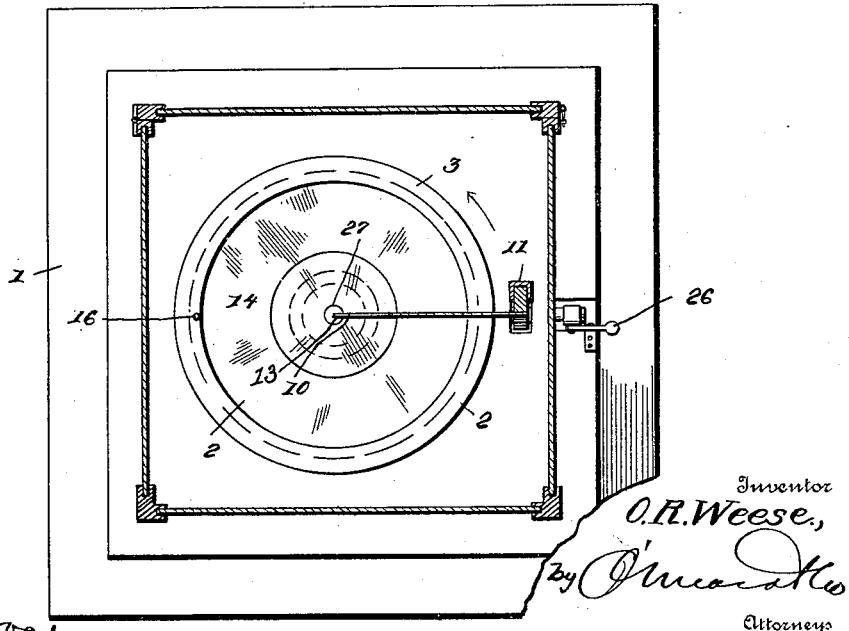
Witnesses
Inventor
O. R. Weese,
By
Attorneys
THE NORRIS PETERS CO., PHOTO-LITHO., WASHINGTON, D. C.

UNITED STATES PATENT OFFICE.

OTIS ROBERT WEESE, OF SYRACUSE, OHIO.

CHEESE CASE AND KNIFE.

SPECIFICATION forming part of Letters Patent No. 667,413, dated February 5, 1901.

Application filed April 14, 1900. Serial No. 12,915. (No model.)

*To all whom it may concern:*

Be it known that I, OTIS ROBERT WEESE, a citizen of the United States, residing at Syracuse, in the county of Meigs and State of Ohio, have invented a new and useful Cheese Case and Knife, of which the following is a specification.

My invention relates to cheese-cases, and more especially to one provided with a vertically-reciprocatory blade by means of which the desired amount of cheese may be cut from the entire cheese; and it consists in the improved construction and novel arrangement of parts of the same, as will be hereinafter more fully set forth.

In the accompanying drawings, in which the same reference-numerals indicate corresponding parts in each of the views in which they occur, Figure 1 is a vertical sectional detail view of my improved cheese case and knife arranged in operative position upon the counter, the door being shown open in dotted lines. Fig. 2 is a transverse sectional view looking downward, the cheese being shown in dotted lines; and Fig. 3 is a detail view.

Referring more particularly to the drawings, 1 indicates my improved case, which may be of any suitable size, style, and finish, within which is rotatably mounted a platform 2, upon which the cheese 3 is placed for manipulation. The cheese is held against rotation while it is being cut by means of a vertically-sliding clamp 4, the socket of which fits upon the depending post or rod 5, which is preferably angular in cross-section and has one face provided with ratchet-teeth 6. One side of the clamp is slotted radially and longitudinally, as shown at 7, and a pawl 8 is pivotally secured therein, the upper end of which is adapted to normally engage with the ratchet-teeth 6 and hold the clamp in positive engagement with the cheese, and thereby prevent the latter from moving. The lower end of the pawl is provided with a slot or notch 9, in which the tip of the knife 10 is adapted to enter for swinging the pawl upon its pivot and releasing its opposite end from the ratchet-teeth, and thereby permit of the clamp being raised from the cheese with the upward movement of the knife.

The knife is secured to the upper end of a vertically-movable bar 11, so as to extend downward, and has its cutting edge beveled toward the point and the heel, so as to form a slight angular projection 12, which will enter the cheese in advance of the remaining portion of the blade, and thereby cause the passage of the knife through the cheese much easier than with a straight-edged knife. The tip of the knife is preferably formed or provided with a slight projection or nose 13, which engages with the notched portion of the pawl 8 when the knife is being raised. The upper surface of the table or platform 2 is provided with an annular recess 14, the walls of which are inclined to substantially correspond with the bevel or inclination of the edge of the knife, and, if desired, it may be lined or provided with lead or other suitable material to prevent the knife being dulled by contact therewith, or the table may be formed from wood or other desirable material. Antifriction devices, as rollers 15, are preferably located at suitable distances apart in the upper surface of the base or bottom of the case, upon which the platform is revolved. A suitable pin 16 projects upwardly from the top of the table or platform for the purpose of entering the cheese and retaining it in position thereon.

The bar 11, to which the knife is secured, is suspended at one edge of the case by means of a spring 17, which normally holds the knife at a suitable distance above the cheese to permit of the turning of the latter, and its lower end is preferably secured to a treadle 18, which may be secured below the counter in any desired manner. However, I prefer to arrange the treadle nearly parallel with the counter, so that its free end will not project beyond the inner edge thereof and be in the way of the attendants as they walk back and forth behind the counter. The intermediate portion of the bar 11 is provided with gear-teeth 19 and is passed down through the bottom of the case, and, if desired, through a suitable opening in the counter. A shaft 20 is journaled within the base in bearings 21 and is provided with two pinions 22 and 23, one of which is adapted to be thrown into or out of engagement with an annular rack 24 upon the bottom of the table or platform 1 and the other one is adapted to be thrown into or out of engagement with the gear-teeth 19 upon the bar 11. A spring 25 is coiled around the shaft and has one end secured thereto and the opposite end in engagement with one of the bearings, so as to normally hold the pinions in engagement with their respective racks. A lever 26 is pivotally secured in one side of the case, so as to project above the base upon the outside of the case, in position to be moved back and forth by the operator, the lower end of the lever being pivotally connected with the outer end of the shaft in any desired manner.

As above described, it will be seen that by the use of my improved case and knife the cheese can be protected from injury or damage by placing it within the case and closing the door, the walls of the case being preferably formed from some porous material—as, for instance, closely-woven wire—so as to permit a free circulation of air, but which will exclude mice, insects, &c. When a new cheese is put into the case, it is arranged so that its center will lie directly above the pivot-point or axle 27 of the platform and be forced down upon the pin 16.

When it is desired to cut off any of the cheese, the handle or lever 26 is swung outward upon its pivot, so as to cause the pinions upon the shaft 20 to engage with their respective racks ready for operation. The knife, which normally is located at a slight distance above the top of the cheese, is then moved downward by the pressure of the foot of the operator applied to the treadle, which will cause the rotation of the shaft a sufficient extent to rotate the table and carry the cheese around upon the platform far enough to cause the knife to cut off the desired quantity of cheese. As soon as the cheese has been rotated far enough the pinions are thrown out of engagement with their racks by moving the upper end of the lever inward or toward the case. The knife is then forced downward through the cheese by the continued pressure upon the treadle and the resultant downward movement of the knife-bar, the platform remaining stationary during such subsequent movement. The rack upon the lower surface of the table is preferably made of small diameter and located very near the pivot-point of the table, and the pinion 22 is formed of a sufficient diameter to cause the rotation of the table quite a distance with a very small downward movement of the bar and consequent rotation of the shaft. In this manner the platform and cheese can be rotated quite a distance during the movement of the knife from its point of rest to the top of the cheese, thereby rendering the capacity of the instrument sufficient for any amount of cheese, from the very smallest amount called for to the largest that will probably be called for; but if it is not sufficient its capacity may be increased by releasing the pinions from their racks and permitting the knife to be raised to its normal position and again lowered one or more times before the cut is made, the pinions being thrown into gear at each downward movement of the knife and released upon the upstroke. As the knife is moved downward toward the cheese the clamp 4 is forced down onto the cheese by means of a coiled spring 28 with a sufficient force to cause the teeth 29 upon its under surface to engage with the top of the cheese and hold it and the platform perfectly rigid and stationary during the passage of the knife through the cheese. If desired, a nut 30 may be located upon the post above the spring for the purpose of adjusting the tension of the latter and rendering it operative with cheese of different thicknesses, and a spring 31 may be arranged to engage with the pawl 8 and cause it to be forcibly held in engagement with the teeth of the post except when disengaged by the action of the knife.

By arranging the treadle longitudinally of the counter it will be out of the way for passing back and forth behind the counter, yet will be in convenient position for operation when it is desired to use the knife. By locating the handle for manipulating the shaft and the pinions upon the outside of the case the entire operation of adjusting the cheese and operating the knife may be performed without opening the case, thereby only requiring the case to be opened long enough to reach in and take out the piece of cheese after it has been severed, thus preventing the entrance of insects into the case.

Although I have shown what I consider to be the most desirable form for constructing my improved cheese case and knife, yet I reserve to myself the right to make such changes and alterations therein as will come within the scope of my invention.

Having thus fully described my invention, what I claim as new, and desire to secure by Letters Patent, is—

1. The combination, with a cheese-case provided with a rotary table, of a clamp for holding the cheese, a lock for the clamp a reciprocatory knife within the case adapted to engage with said lock and release the cheese-holding clamp, and adjustable means connected with the knife for partially rotating the table, substantially as described.

2. The combination, with a case provided with a rotary table, of a reciprocatory bar, the intermediate portion of which is provided with gear-teeth, of a knife at the upper end of the bar in position to overhang the table, a longitudinally-movable shaft, the inner end of which is provided with a connector which is adapted to be thrown into and out of engagement with the table and the outer end is provided with a pinion in position to be moved into and out of gear with the reciprocatory bar, and means for reciprocating said bar, substantially as described.

3. The combination, with a case provided with a rotary table, of an annular rack secured to the under side of the table, bearings in the base of the case, a shaft therein, two pinions on the shaft, one of which is in detachable engagement with the rack, a reciprocatory bar, the intermediate portion of which is provided with teeth adapted to engage with the other pinion, a knife upon the upper end of the bar in position to overhang the table, a lever for moving said shaft so as to throw said pinions out of engagement with the rack and bar respectively, a spring secured to the shaft at one end and having its opposite end in engagement with one of the bearings for normally holding said pinions in engagement with the rack and bar, a treadle for moving the bar downward, and a spring for moving it upward, substantially as described.

4. The combination, with a case, of a rotary table mounted therein, the top of which is provided with an annular recess, of a post depending from the top of the case, a spring-actuated clamp on the post, a reciprocatory bar yieldingly suspended from one side of the case, the top of which is provided with a knife to overhang the table, the cutting edge of the knife being beveled to correspond with the angle of the walls of the recess in the table, and means for reciprocating the bar and automatically rotating the table, substantially as described.

5. The combination, with a case, of a table rotatably mounted upon the base, of a post depending from the top of the case in alinement with the axis of the table, the lower portion of which is angular in cross-section and one side is provided with teeth, of a clamp upon the post, one side of which is slotted radially, a pawl pivoted within said slot, the upper end of which is adapted to engage with the teeth of the post, of a spring on the post above the clamp and in engagement therewith, means for varying the tension of said spring, a reciprocatory bar yieldingly suspended from one side of the case, a knife overhanging the table and adapted to enter the slot in the clamp, the tip of the knife being adapted to engage with the lower end of the pawl, and means for reciprocating the bar and automatically rotating the table, substantially as described.

OTIS ROBERT WEESE.

Witnesses:
W. J. LAWRENCE,
E. H. KILLINGSWORTH.